United States Patent
Zhou et al.

(10) Patent No.: US 12,361,197 B2
(45) Date of Patent: Jul. 15, 2025

(54) METHOD OF REDUCING DESIGN RULE VIOLATIONS DUE TO IR DROPS

(71) Applicants: TAIWAN SEMICONDUCTOR MANUFACTURING COMPANY, LTD., Hsinchu (TW); TSMC NANJING COMPANY, LIMITED, Nanjing (CN)

(72) Inventors: Fa Zhou, Hsinchu (TW); JinXin Liu, Hsinchu (TW); Chieh-Fu Chu, Hsinchu (TW); Yen-Feng Su, Hsinchu (TW); Chia-Chun Liao, Hsinchu (TW); Meng-Hsuan Wu, Hsinchu (TW); Dei-Pei Liu, Hsinchu (TW)

(73) Assignees: TAIWAN SEMICONDUCTOR MANUFACTURING COMPANY, LTD., Hsinchu (TW); TSMC NANJING COMPANY, LIMITED, Nanjing (CN)

( * ) Notice: Subject to any disclaimer, the term of this patent is extended or adjusted under 35 U.S.C. 154(b) by 672 days.

(21) Appl. No.: 17/691,622

(22) Filed: Mar. 10, 2022

(65) Prior Publication Data

US 2023/0274072 A1 Aug. 31, 2023

(30) Foreign Application Priority Data

Feb. 28, 2022 (CN) .......................... 202210186707.0

(51) Int. Cl.
*G06F 30/398* (2020.01)
*G06F 30/392* (2020.01)
*G06F 119/06* (2020.01)

(52) U.S. Cl.
CPC ........ *G06F 30/398* (2020.01); *G06F 2119/06* (2020.01)

(58) Field of Classification Search
CPC ... G06F 30/398; G06F 2119/06; G06F 30/392
See application file for complete search history.

(56) References Cited

U.S. PATENT DOCUMENTS

| | | | |
|---|---|---|---|
| 6,397,373 B1 * | 5/2002 | Tseng | G06F 30/398 716/139 |
| 7,260,442 B2 | 8/2007 | Hwang et al. | |
| 9,256,709 B2 | 2/2016 | Yu et al. | |
| 10,417,367 B2 | 9/2019 | Wang et al. | |

(Continued)

FOREIGN PATENT DOCUMENTS

| | | |
|---|---|---|
| CN | 107403024 | 11/2017 |
| CN | 111400988 | 7/2020 |

(Continued)

*Primary Examiner* — Nghia M Doan
(74) *Attorney, Agent, or Firm* — Hauptman Ham, LLP (57) ABSTRACT

A method includes identifying a cell in the layout diagram as a violated cell that fails to pass one or more design rules related to IR drops, and classifying a root cause of the violated cell with a root cause class. The method also includes determining a searching area for searching safe region candidates, and finding a selected cell for moving based upon the root cause class of the root cause. The method further includes finding a safe region in the searching area for moving the selected cell, and moving the selected cell to the safe region if the safe region is found within the searching area.

20 Claims, 8 Drawing Sheets

(56) References Cited

U.S. PATENT DOCUMENTS

| | | | |
|---|---|---|---|
| 2008/0120583 A1* | 5/2008 | Fujii | G06F 30/39 |
| | | | 716/132 |
| 2008/0244497 A1 | 10/2008 | Zhao et al. | |
| 2014/0040838 A1 | 2/2014 | Liu et al. | |
| 2015/0278429 A1 | 10/2015 | Chang | |
| 2022/0067265 A1* | 3/2022 | Hwang | G06F 30/398 |

FOREIGN PATENT DOCUMENTS

| | | |
|---|---|---|
| TW | 201738789 | 11/2017 |
| TW | I647582 | 1/2019 |
| TW | 202013065 | 4/2020 |

\* cited by examiner

METHOD OF REDUCING DESIGN RULE VIOLATIONS DUE TO IR DROPS

BACKGROUND

The recent trend in miniaturizing integrated circuits (ICs) has resulted in smaller devices which consume less power yet provide more functionality at higher speeds. The miniaturization process has also resulted in stricter design and manufacturing specifications as well as reliability challenges. Various electronic design automation (EDA) tools generate, optimize and verify standard cell layout designs for integrated circuits while ensuring that the standard cell layout design and manufacturing specifications are met.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, materials, values, steps, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

In some embodiments, when an EDA program finds a cell in a layout diagram that fails to pass an IR drop test, the EDA program identifies the failed cell as a violated cell and classifies a root cause of the violated cell. The EDA program further determines a searching area for searching for a safe region, which is a location in the layout diagram for positioning a cell without causing design rule violations due to IR drops. Based upon the classification of the root cause, the EDA program then finds a selected cell for moving. If a safe region is found within the searching area, the EDA program moves the selected cell to the safe region. Because the EDA program is implemented with the mitigation processes for eliminating some of the root causes of the violated cell, the number of design rule violations due to IR drop in a layout diagram that needs to be manually checked by users is reduced.

Figure 1:
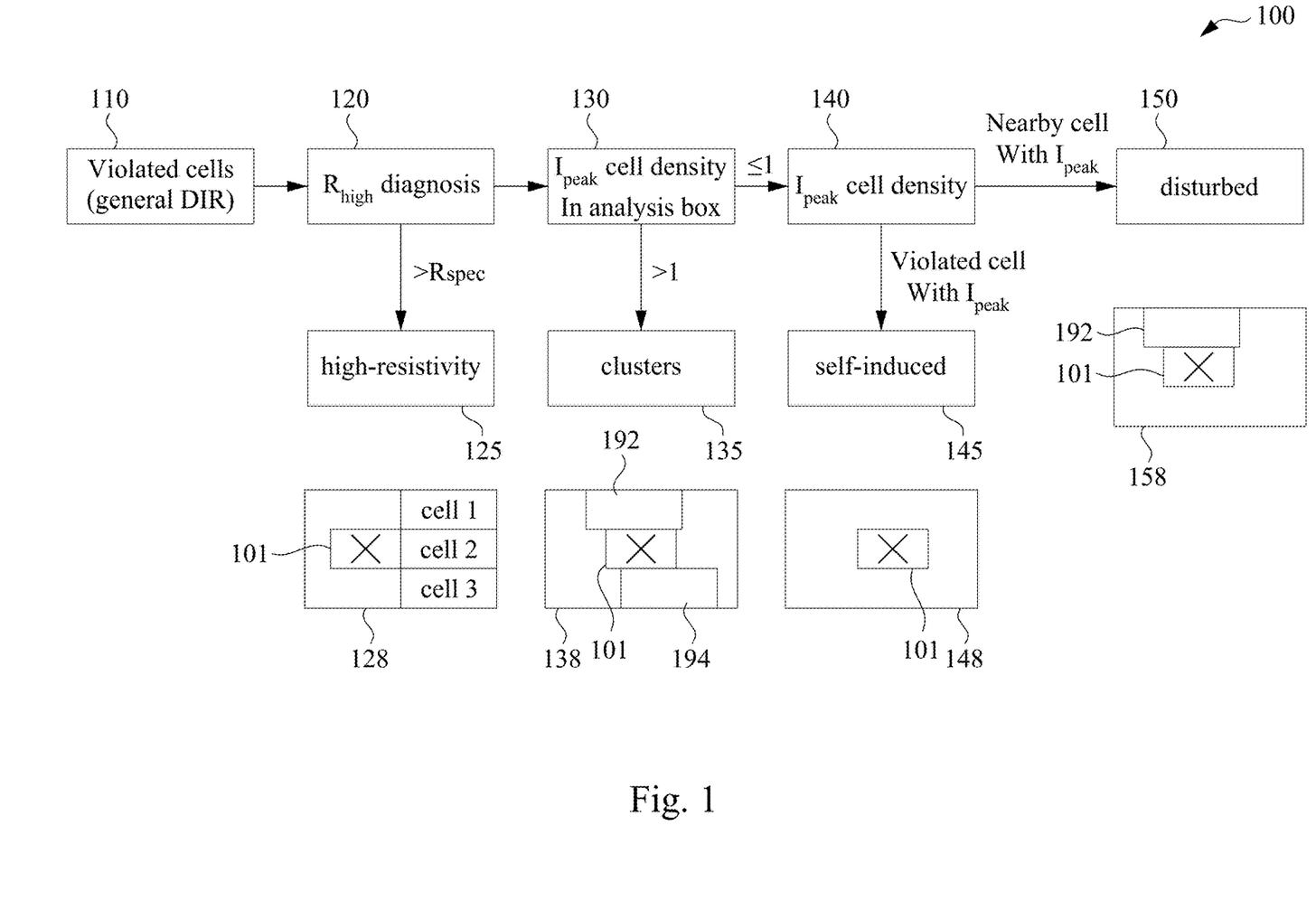
FIG. 1 is a flowchart of a method of classifying root causes of a violated cell, in accordance with some embodiments.

FIG. 1 is a flowchart of a method 100 of classifying root causes of a violated cell, in accordance with some embodiments. The sequence in which the operations of method 100 are depicted in FIG. 1 is for illustration only; the operations of method 100 are capable of being executed in sequences that differ from that depicted in FIG. 1. It is understood that additional operations may be performed before, during, and/or after the method 100 depicted in FIG. 1, and that other processes may only be briefly described herein.

In operation 110 of method 100, violated cells in a layout diagram are identified. Each of the identified violated cells fails to pass one or more design rules related to IR drops. In some embodiments, each of the violated cells is in a power domain that has an upper power supply voltage VDD and a lower supply voltage VSS. In some embodiments, the violated cells are distributed in two different power domains. Some of the violated cells are in a first power domain, and some of the violated cells are in a second power domain. The first power domain has a first upper power supply voltage VDD1 and a first lower supply voltage VSS1. The second power domain has a second upper power supply voltage VDD2 and a second lower supply voltage VSS2. In some embodiments, the first upper power supply voltage VDD1 is different from the second upper power supply voltage VDD2, and the first lower supply voltage VSS1 is different from the second lower supply voltage VSS2. In some embodiments, the first lower supply voltage VSS1 is the same as the second lower supply voltage VSS2. In some embodiments, each of the first lower supply voltage VSS1 and the second lower supply voltage VSS2 is equal to the ground voltage GND. In some embodiments, the violated cells are distributed in three or more different power domains.

The root causes of the violated cells identified in operation 110 are analyzed in operations 120, 130, and 140. In operation 120 of method 100, an IR resistive value of a violated cell is compared with a reference value in operation 120 (which is labeled as $R_{high}$ diagnosis). If the IR resistive value is larger than the reference value, a root cause of the violated cell is a resistivity class, which is labeled as high-resistivity in operation 125. The process flow then proceeds to operation 130. In some embodiments, the IR resistive value selected for the comparison in operation 120 is the value of an effective resistance $R_{eff}$ related to the supply voltages VSS and VDD of the power domain for powering the violated cell. In some embodiments, the effective resistance $R_{eff}$ is taken to be the ratio between the voltage difference (VDD−VSS) and the current IDD flowing into the violated cell from the power rails for the upper supply voltage VDD, as expressed in equation $R_{eff}$=(VDD−VSS)/IDD. In some embodiments, the effective resistance $R_{eff}$ is taken to be the ratio between the voltage difference (VDD−VSS) and the current ISS flowing from the violated cell into the power rails for the lower supply voltage VSS, as expressed in equation $R_{eff}$=(VDD−VSS)/ISS. In some embodiments, the effective resistance $R_{eff}$ is taken to be the ratio between the voltage difference (VDD−VSS) and the average of the current IDD and the current ISS, as expressed in equation $R_{eff}$=2(VDD−VSS)/(IDD+ISS).

In some embodiments, the effective resistance $R_{eff}$ is compared with a critical resistance value $R_{spec}$. If $R_{eff}$ is larger than $R_{spec}$, the root cause of the violated cell is a resistivity class. The inset 128 of FIG. 1 depicts an example cell arrangement when the root cause of the violated cell is the resistivity class. In the inset 128, the violated cell 101 and three other cells (cell1, cell2, and cell3) are positioned in a selected area of the layout diagram. In FIG. 1, the effective resistance $R_{eff}$ is used as a resistive figure of merit in operation 120, and the effective resistance $R_{eff}$ is compared with a critical resistance value $R_{spec}$. The resistive figure of merit is a physical quantity that is used for determining whether the root cause of a violated cell is a resistivity class. In some alternative embodiments, the effective conductance $G_{eff}$=1/$R_{eff}$ is used as a resistive figure of merit in operation 120. If the effective conductance $G_{eff}$ is smaller than a critical conductance value $G_{spec}$, the root cause of the violated cell is a resistivity class. Other selections of the resistive figure of merit are within the scope of the present disclosure.

In operation 130 of method 100, $I_{peak}$ cell density in the vicinity of the violated cell is determined. Each of the $I_{peak}$ cells for determining the $I_{peak}$ cell density is either the violated cell or an adjacent cell that is adjacent to the violated cell. In some embodiments, whether a given cell is counted as an $I_{peak}$ cell depends upon the current IDD flowing into the given cell from the power rails for the upper supply voltage VDD and/or the current ISS flowing from the given cell into the power rails for the lower supply voltage VSS. In some embodiments, if the current IDD flowing into a selected cell from the power rails is larger than a critical current value $I_{spec}$, then the selected cell is an $I_{peak}$ cell. In some embodiments, if the current ISS flowing from a selected cell into the power rails is larger than a critical current value $I_{spec}$, then the selected cell is an $I_{peak}$ cell. In some embodiments, if each of the current IDD and the current ISS is larger than a critical current value $I_{spec}$, then the selected cell is an $I_{peak}$ cell.

In operation 130, if the number of $I_{peak}$ cells is larger than one, a root cause of the violated cell is a cluster class, which is labeled as clusters in operation 135. The process flow then proceeds to operation 140. The inset 138 of FIG. 1 depicts a violated cell 101 and two adjacent cells 192 and 194 that are adjacent to the violated cell 101. Because the violated cell 101 has two adjacent cells which are $I_{peak}$ cells (i.e., 192 and 194), the root cause of the violated cell 101 is a cluster class.

In operation 140 of method 100, if the number of $I_{peak}$ cells is equal to one and the only $I_{peak}$ cell is the violated cell itself, a root cause of the violated cell is a self-induced class, which is labeled as self-induced in operation 145. On the other hand, if the number of $I_{peak}$ cells is equal to one and the only $I_{peak}$ cell is an adjacent cell that is adjacent to the violated cell, a root cause of the violated cell is a disturbed class, which is labeled as disturbed in operation 155. The inset 148 of FIG. 1 depicts a violated cell 101 which is an $I_{peak}$ cell. The root cause of the violated cell 101 in the inset 148 is a self-induced class. The inset 158 of FIG. 1 depicts a violated cell 101 and an adjacent cell 192 which is an $I_{peak}$ cell. The root cause of the violated cell 101 in the inset 158 is a disturbed class.

During the process flow in FIG. 1, the root causes of violated cells as identified in operation 110 are classified into various root cause classes. Possible root cause classes for a violated cell include a resistivity class, a cluster class, a self-induced class, and a disturbed class. In some embodiments, the violated cells as identified in operation 110 are modified by an EDA program to automatically mitigate the design rule violations related to IR drops. In some embodiments, the algorithm or the method for correcting the IR drop problems in a given violated cell depends upon the class of each root cause that causes the IR drop problems in the given violated cell. A different root cause class dictates a different algorithm or different method for correcting the IR drop problems. An IR drop problem that needs to be corrected is either a dynamic IR ("DIR") drop problem or a static IR ("SIR") drop problem. In this disclosure, a problem due to one or more design rule violations related to IR drops is generally referred to as a DIR/SIR problem.

Static IR drop is an average voltage drop for the design. It is dependent on the RC of the power grid connecting the power supply to the respective standard cells. The average current depends totally on the time period. Gate-channel leakage current is the major reason for the static IR drop. Dynamic IR drop is a voltage drop due to currents flowing when the circuit is switching when performing some functions.

Figure 2:
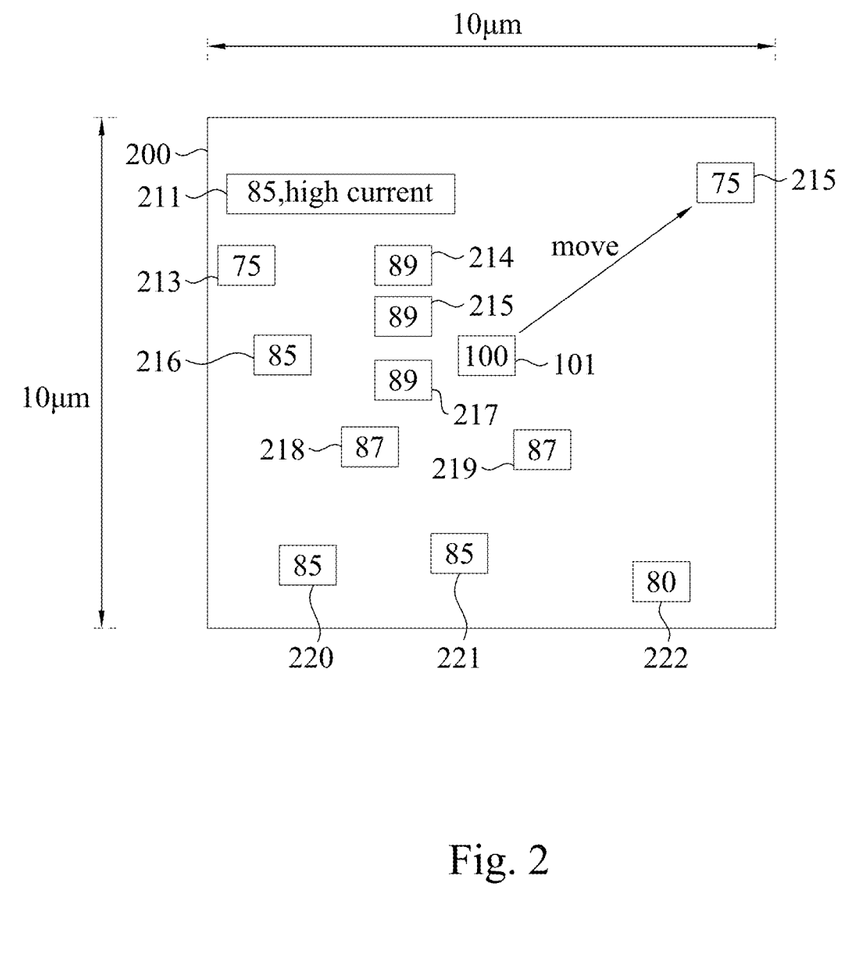
FIG. 2 is a schematic diagram of cell locations distributed in a searching area, in accordance with some embodiments.

In some embodiments, when the EDA program determines that the root cause class for a violated cell is a resistivity class, the EDA program automatically starts to search for a safe region in a searching area surrounding the violated cell. If the EDA program finds a safe region, the EDA program then moves the violated cell to the safe region to correct the DIR/SIR problem associated with the violated cell. FIG. 2 is a schematic diagram of safe region candidates 211-222 distributed in a searching area 200 surrounding a violated cell 101, in accordance with some embodiments. In FIG. 2, the violated cell 101 is located at the center of the searching area 200. In some alternative embodiments, the searching area 200 still surrounds the violated cell 101, but the violated cell 101 is not located at the center of the searching area 200. In some embodiments, the violated cell 101 is shifted horizontally from the center of the searching area 200. In some embodiments, the violated cell 101 is shifted vertically from the center of the searching area 200. In some embodiments, the violated cell 101 is shifted both horizontally and vertically from the center of the searching area 200.

In the searching area 200 of FIG. 2, the safe region for moving the violated cell 101 is determined based upon a resistive figure of merit. In FIG. 2, the resistive figure of merit for characterizing a cell at each safe region candidate is a relative number, and the relative number for characterizing the violated cell 101 is 100%. The percentage sign % in each relative number is not explicitly shown in FIG. 2. For example, the relative number 100% is displayed as 100 in FIG. 2. In some embodiments, the resistive figure of merit ("RFM") of a chosen cell is the ratio between the effective resistance of the chosen cell and the effective resistance of the violated cell 101, expressed as $R_{\it eff}$(chosen cell)/$R_{\it eff}$ (violated cell) multiplied by 100%. Or equivalently, the resistive figure of merit ("RFM") of a chosen cell is the ratio between the effective conductance of the violated cell 101 and the effective conductance of the chosen cell, expressed as $G_{\it eff}$(violated cell)/$G_{\it eff}$(chosen cell) multiplied by 100%. In FIG. 2, the RFM values of the cell at the safe region candidates 211, 212, 213, and 214 are correspondingly 85%, 75%, 75%, and 89%. The RFM values of the cell at the safe region candidates 215, 216, 217, and 218 are correspondingly 89%, 85%, 89%, and 87%. The RFM values of the cell at the safe region candidates 219, 220, 221, and 222 are correspondingly 87%, 85%, 85%, and 80%.

In some embodiments, after a root cause of the violated cell 101 is classified as a resistivity class by an EDA program, a searching area 200 is automatically generated by the EDA program, and safe region candidates within the searching area 200 are then determined by the EDA program. The RFM value of a cell at each safe region candidate is calculated. In some embodiments, one or more safe region candidates that have the minimal RFM value are selected. In some embodiments, when multiple safe region candidates are found to have the minimal RFM value, the safe region candidate that is positioned close to a high current cell is rejected. For example, in the searching area 200, each of the safe region candidates 212 and 213 is corresponding to an RFM value of 75%. A cell positioned at the safe region candidate 213 is close to a high current cell at the safe region candidate 211. Consequently, only the safe region candidate 212 is found to be a safe region, provided that a cell at the safe region candidate 212 does not suffer from additional DIR/SIR problems. After the safe region at the safe region candidate 212 is found by the EDA program, the violated cell 101 is moved to the safe region at the safe region candidate 212 by the EDA program, as depicted in FIG. 2.

In the specific example as shown in FIG. 2, the width and the height of the searching area 200 are both 10 micrometers. In some embodiments, most of the cells in the searching area 200 have a uniform height "h" extending in a Y-direction and the height of the searching area 200 is in a range from 10 h to 100 h. In some embodiments, most of the cells in the searching area 200 include gate-conductors extending in the Y-direction which form the gate terminals of various transistors. Two adjacent gate-conductors are separate from each other with a pitch distance along an X-direction that is perpendicular to the Y-direction, and the pitch distance between two adjacent gate-conductors in the searching area 200 is often equal to one CPP ("Contacted Poly Pitch"). In some embodiments, the width of the searching area 200 is in a range from 50 CPP to 500 CPP. In general, each of the width and the height of the searching area 200 needs to be sufficiently large to include safe region candidates in a power domain that is the same as the power domain for the violated cell 101. For example, if a layout area in the vicinity of the violated cell 101 includes both a core power domain and an I/O power domain, the safe region candidates in the core power domain are excluded for safe region selections if the violated cell 101 is in the I/O power domain, and conversely the safe region candidates in the I/O power domain are excluded for safe region selections if the violated cell 101 is in the core power domain. In general, the speed performance requirements for the EDA program place some upper limits on the width and the height of the searching area 200, because increasing the size of the searching area 200 may also increase the time required for finding the safe region by the EDA program with some implementations of the algorithm.

Figure 3:
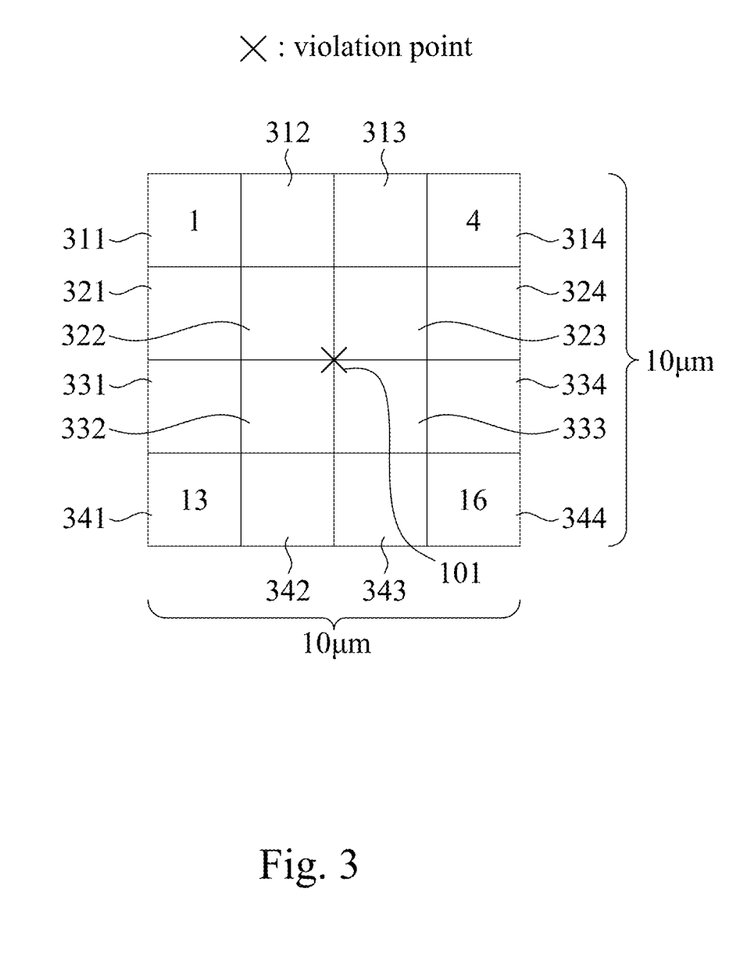
FIG. 3 is a schematic diagram of a searching area having multiple analysis regions, in accordance with some embodiments.

In some embodiments, with some improvements of the algorithm, the time required for finding the safe region by the EDA program is decreased even if the size of the searching area 200 remains the same. One of the improved algorithms for finding the safe region is described with reference to FIG. 3. FIG. 3 is a schematic diagram of a searching area 200 having multiple analysis regions, in accordance with some embodiments. In FIG. 3, the violated cell 101 is initially located at the violation point at the center of the searching area 200. The searching area 200 is divided into sixteen analysis regions, before the EDA program starts to search for the safe region in the searching area 200. The sixteen analysis regions include four analysis regions 311-314 in the first row, four analysis regions 321-324 in the second row, four analysis regions 331-334 in the third row, and four analysis regions 341-344 in the fourth row. In some embodiments, after the cell density in each of sixteen analysis regions is determined, the EDA program first searches the safe region in the analysis region that has the lowest cell density and then searches the safe region in the analysis region that has the second lowest cell density. The EDA program continues to search the analysis regions one by one, in the order of increasing cell density in each following analysis region, until the safe region is found. In some embodiments, after the safe region is found, the EDA program automatically moves the violated cell 101 to the safe region. The sixteen analysis regions in the searching area 200 of FIG. 3 are provided as an example for a specific embodiment. In some alternative embodiments, the searching area 200 is divided into more than sixteen analysis regions. In some alternative embodiments, the searching area 200 is divided into less than sixteen analysis regions.

In some embodiments, when the EDA program determines that the root cause class for a violated cell is a cluster class, the EDA program automatically selects an adjacent cell that has the highest peak current as a selected cell for moving. The adjacent cell that has the highest peak current is either moved to a safe region or moved into a keep-out area by the EDA program to correct the DIR/SIR problem. A keep-out area for a given cell is an area for positioning the given cell inside which has surrounding areas enclosing the given cell for physical separating the given cell from other cells in a layout diagram.

Figure 4A:
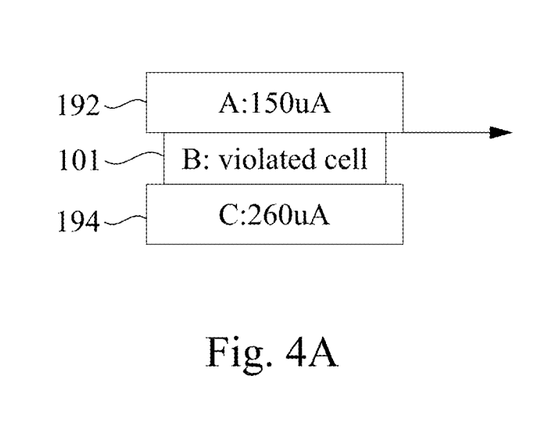
FIGS. 4A-4B are schematic diagrams of cell layout arrangements before and after an adjacent cell is moved away, in accordance with some embodiments.
Figure 4B:
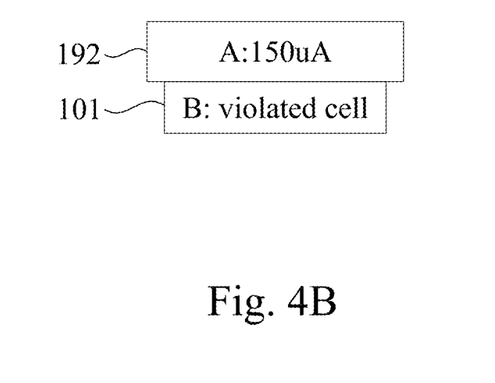

FIGS. 4A-4B are schematic diagrams of cell layout arrangements before and after an adjacent cell is moved away from the violated cell, when the root cause of the violated cell belongs to a cluster class, in accordance with some embodiments. In FIG. 4A, a violated cell 101 is adjacent to two adjacent cells 192 and 194. In some embodiments, after the violated cell 101 is identified in a layout diagram, the peak current $I_{peak}$ in one or more adjacent cells is determined. In FIG. 4A, the peak current $I_{peak}$ in two adjacent cells 192 and 194 is correspondingly equal to 150 uA and 260 uA. In some embodiments, the peak current $I_{peak}$ of a cell is measured as the current IDD flowing into the cell from the power rails for the upper supply voltage VDD. In some embodiments, the peak current $I_{peak}$ of a cell is measured as the current ISS flowing from the given cell into the power rails for the lower supply voltage VSS. In some embodiments, the peak current $I_{peak}$ of a cell is the average of the current IDD and the current ISS.

In some embodiments, after the peak current $I_{peak}$ in the adjacent cells is determined, the adjacent cell that has the highest peak current among all adjacent cells is selected, and the selected adjacent cell is moved away from the violated cell to a safe region. Moving the adjacent cell that has the highest peak current is more effective in solving the DIR/SIR problem associated with the violated cell, because the larger the peak current, the larger the IR drop which is produced in the violated cell. In FIG. 4A, the adjacent cell 194 having the peak current 260 uA is moved away from the violated cell 101. The adjacent cell 194 is moved to a safe region which is not shown in FIG. 4A or FIG. 4B. After the adjacent cell 194 having the peak current 260 uA is moved away from the violated cell 101, as shown in FIG. 4B, only one adjacent cell 192 is still adjacent to the violated cell 101.

In some embodiments, when all of the adjacent cells in the vicinity of the violated cell are data cells, the adjacent cell that has the highest peak current is selected to be moved away from the violated cell. In some embodiments; however, when the adjacent cells in the vicinity of the violated cell include both data cells and clock cells, the selection of the adjacent cell for moving depends upon the timing impact due to the position change of a clock cell. If the timing impact of moving a clock cell is not subject to restrictions, then the adjacent cell that has the highest peak current is selected to be moved away from the violated cell regardless of whether the adjacent cell having the highest peak current is a data cell or a clock cell. On the other hand, if the timing impact of moving a clock cell is restricted, then clock cells are not allowed to be moved and one of the data cells is selected to be moved away; under the restriction that the adjacent data cell that has the highest peak current among all adjacent data cells is selected for moving, even if one or more clock cells have a peak current larger than the peak current of the data cell selected for moving.

In some embodiments, before the selected adjacent cell is moved to a safe region, the safe region is found by an EDA program by searching the safe region in a searching area surrounding the violated cell. The EDA program ensures that the selected adjacent cell moved to the safe region does not suffer from DIR/SIR problems and is not moved to a power domain that is different from the previous power domain of the selected adjacent cell before moving. For example, the selected adjacent cell positioned at the safe region is not adjacent to any $I_{peak}$ cells, and the resistive figure of merit (such as effective resistance $R_{eff}$) of the selected adjacent cell positioned at the safe region does not indicate design rule violations.

Figure 5A:
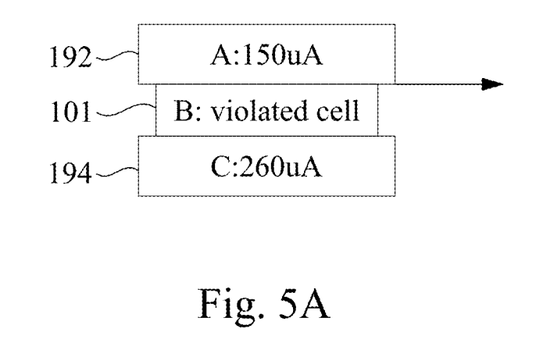
FIGS. 5A-5B are schematic diagrams of cell layout arrangements before and after an adjacent cell is moved into a keep-out area, in accordance with some embodiments.
Figure 5B:
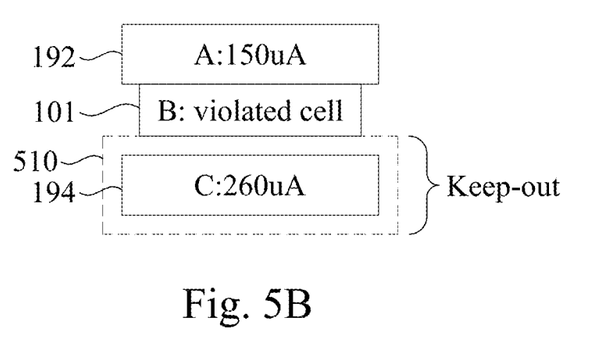

In some embodiments, when the searching of safe regions in the searching area surrounding the violated cell does not return any valid safe regions for moving the selected adjacent cell of the violated cell, the EDA program positions the selected adjacent cell in a keep-out area, thereby reducing the contribution to the DIR/SIR problem by the leak current of the selected adjacent cell. FIGS. 5A-5B are schematic diagrams of cell layout arrangements before and after an adjacent cell is moved into a keep-out area, when the root cause of a violated cell belongs to a cluster class, in accordance with some embodiments.

The layout arrangement of the various cells in FIG. 5A is the same as that in FIG. 4A. In both FIG. 4A and FIG. 5A, the violated cell 101 is adjacent to the adjacent cells 192 and 194. Each of the adjacent cells 192 and 194 is an $I_{peak}$ cell, and the peak current $I_{peak}$ in the adjacent cells 192 and 194 are correspondingly equal to 150 uA and 260 uA. The position of the violated cell 101 and the adjacent cell 192 in FIG. 5B are not changed, as compared with the layout arrangement in FIG. 5A. The adjacent cell 194 in FIG. 5B; however, is moved into a keep-out area 510. The adjacent cell 194 is selected for moving into the keep-out area 510, because the adjacent cell 194 has the highest peak current among the adjacent cells that are adjacent to the violated cell 101.

In some embodiments, when the EDA program determines that the root cause class for a violated cell is a disturbed class, the EDA program automatically selects either the violated cell or the adjacent cell as a selected cell for moving. In some embodiments, after the adjacent cell is selected for moving, the adjacent cell which is also an $I_{peak}$ cell is either moved to a safe region or moved into a keep-out area by the EDA program, thereby correcting the DIR/SIR problem caused by the $I_{peak}$ cell. In some embodiments, after the violated cell is selected for moving, the violated cell is moved to a safe region by the EDA program, thereby correcting the DIR/SIR problem caused by the $I_{peak}$ cell.

Figure 6A:
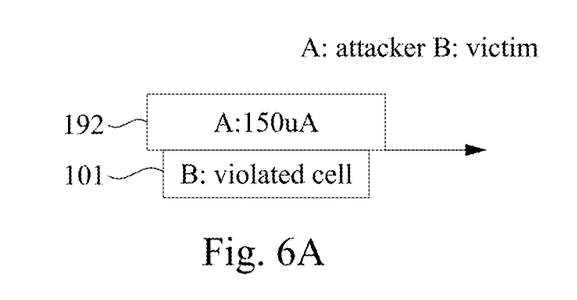
FIGS. 6A-6B are schematic diagrams of cell layout arrangements before and after an adjacent cell is moved away, in accordance with some embodiments.
Figure 6B:
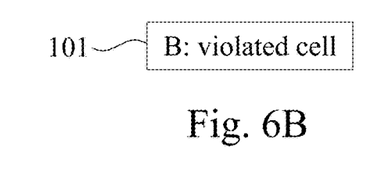

FIGS. 6A-6B are schematic diagrams of cell layout arrangements before and after an adjacent cell is moved away from the violated cell when the root cause of the violated cell belongs to a disturbed class, in accordance with some embodiments. The layout arrangement in FIG. 6A includes a violated cell 101 and an adjacent cell 192. The peak current $I_{peak}$ of the adjacent cell 192 is equal to 150 uA. In some embodiments, the peak current $I_{peak}$ of a cell is measured as the current IDD flowing into the cell from the power rails for the upper supply voltage VDD. In some embodiments, the peak current $I_{peak}$ of a cell is measured as the current ISS flowing from the given cell into the power rails for the lower supply voltage VSS. In some embodiments, the peak current $I_{peak}$ of a cell is the average of the current IDD and the current ISS. When the peak current $I_{peak}$ of the adjacent cell 192 is larger than a critical current value $I_{spec}$, the adjacent cell 192 is characterized as an $I_{peak}$ cell. The DIR/SIR problem caused by the $I_{peak}$ cell is eliminated after the adjacent cell 192 is moved away from the violated cell 101. FIG. 6B depicts the layout arrangement after the adjacent cell 192 is moved away. In FIG. 6B, no adjacent cell is in the vicinity of the violated cell 101.

In some embodiments, the adjacent cell 192 is moved after a safe region is successfully found in a searching area surrounding the violated cell 101. In some embodiments, the adjacent cell 192 is a data cell, and the adjacent cell 192 is allowed to be moved to the safe region by the EDA program. Examples of data cells include logic gate cells such as buffer cells, inverter cells, NAND gate cells, NOR gate cells, AOI gate cells, and various flip-flop cells. In some embodiments, the adjacent cell 192 is a clock cell. Examples of clock cells include clock gating cells used in many synchronous circuits for reducing dynamic power dissipation, by removing the clock signal when the circuit is not in use. If the timing impact of moving the adjacent cell 192 as a clock cell is within an acceptable range, the adjacent cell 192 is then moved to the safe region by the EDA program. In some embodiments, if a safe region is not found in the searching area surrounding the violated cell 101 by the EDA program, the adjacent cell 192 is then moved into a keep-out area. In some embodiments, even if a safe region is successfully found in a searching area, the adjacent cell 192 is still moved into a keep-out area if the timing impact of moving the adjacent cell 192 as a clock cell is is outside the acceptable range.

Figure 7A:
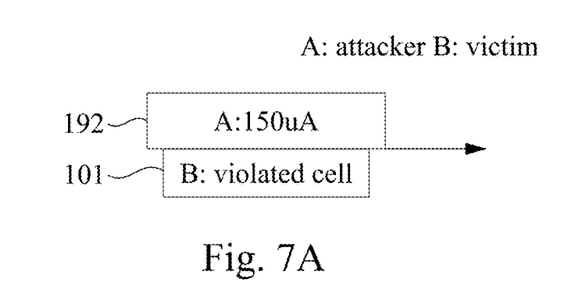
FIGS. 7A-7B are schematic diagrams of cell layout arrangements before and after an adjacent cell is moved into a keep-out area, in accordance with some embodiments.
Figure 7B:
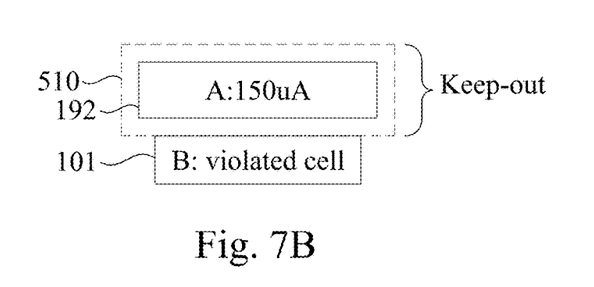

FIG. 7A is a schematic diagram of a cell layout arrangement before the adjacent cell 192 is moved into a keep-out area, when the root cause of a violated cell belongs to a disturbed class, in accordance with some embodiments. The layout arrangements as depicted in FIG. 6A and in FIG. 7A are the same, each of the layout arrangements includes the violated cell 101 and the adjacent cell 192. FIG. 7B is a schematic diagram of a cell layout arrangement before and after the adjacent cell 192 is moved into a keep-out area, when the root cause of a violated cell belongs to a disturbed class, in accordance with some embodiments. In FIG. 7B, the adjacent cell 192 is moved into a keep-out area 510. The moving of the adjacent cell 192 eliminates the DIR/SIR problem caused by the $I_{peak}$ cell.

Figure 8A:
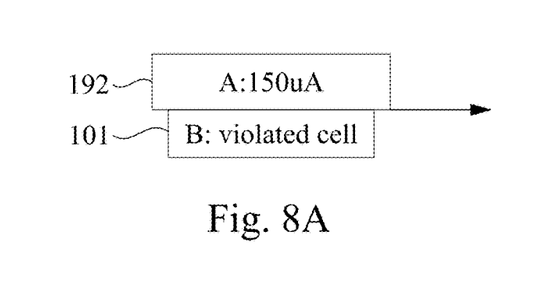
FIGS. 8A-8B are schematic diagrams of cell layout arrangements before and after the violated cell and the adjacent cell are moved, in accordance with some embodiments.
Figure 8B:
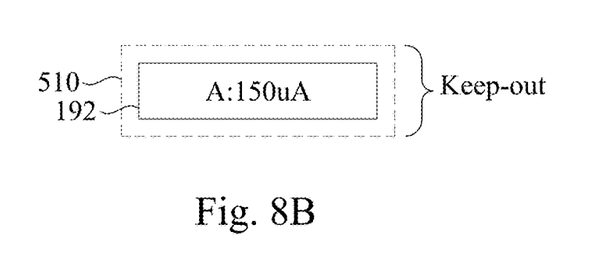

FIGS. 8A-8B are schematic diagrams of cell layout arrangements before and after the violated cell 101 is moved away and the adjacent cell 192 is moved into a keep-out area, when the root cause of the violated cell belongs to a disturbed class, in accordance with some embodiments. The layout arrangement as depicted in FIG. 8A is the same as the layout arrangement in FIG. 6A or FIG. 7A. Each of the layout arrangements in FIG. 6A, FIG. 7A, and FIG. 8A includes the violated cell 101 and the adjacent cell 192. In FIG. 8B, only the adjacent cell 192 within a keep-out area 510 are depicted, because the violated cell 101 is moved away to a safe region (which is not shown in FIG. 8B). After the violated cell 101 is positioned at the safe region, the adjacent cell 192 no longer induces the DIR/SIR problem in the violated cell 101. After the adjacent cell 192 is positioned within a keep-out area 510, potential DIR/SIR problems in other cells induced by the adjacent cell 192 as an $I_{peak}$ cell are also prevented.

Figure 9:
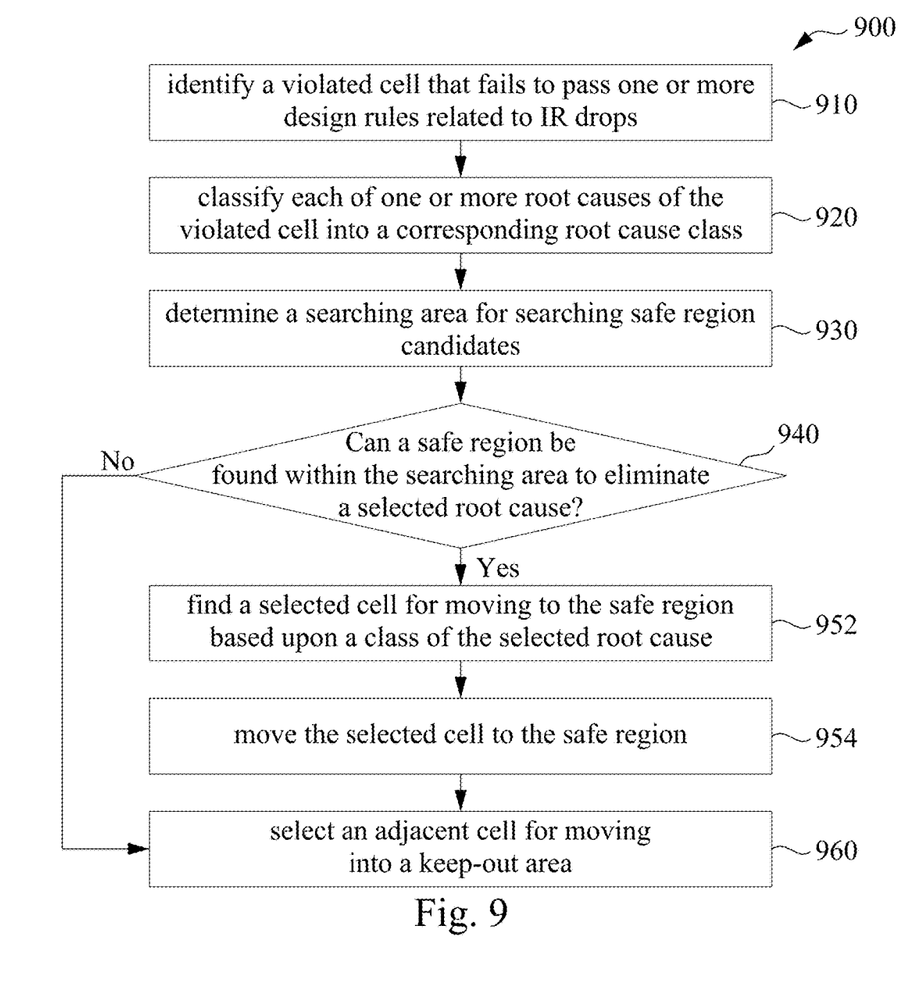
FIG. 9 is a flowchart of a method of designing a layout diagram of an integrated circuit, in accordance with some embodiments.

FIG. 9 is a flowchart of a method 900 of designing a layout diagram of an integrated circuit, in accordance with some embodiments. The sequence in which the operations of method 900 are depicted in FIG. 9 is for illustration only; the operations of method 900 are capable of being executed in sequences that differ from that depicted in FIG. 9. It is understood that additional operations may be performed before, during, and/or after the method 900 depicted in FIG. 9, and that other processes may only be briefly described herein.

In operation 910 of method 900, a violated cell is identified in a layout diagram, because the violated cell fails to pass one or more design rules related to IR drops. In operation 920 of method 900, each of one or more root causes of the violated cell is classified with a corresponding root cause class. In the example embodiments of FIG. 1, a root cause of the violated cell is tested sequentially in the order of a resistivity class, a cluster class, a self-induced class, and a disturbed class. In some alternative embodiments, the order for testing the root cause class is different from the order in FIG. 1. For example in some embodiments, the testing for determining whether the root cause of the violated cell is a cluster class is carried out after the testing for determining whether the root cause of the violated cell is a disturbed class.

In still some other embodiments, the root cause of the violated cell is tested for one or more other root cause classes in operation 910, in addition to the four root cause classes in FIG. 1 (i.e., the resistivity class, the cluster class, the self-induced class, and the disturbed class). For example, in some embodiments, the root cause of the violated cell is also tested for a fan-out class in addition to the four root cause classes in FIG. 1. One possible root cause of a DIR/SIR problem that fits in the fan-out class is due to the current on a conducting line that connects the output of a driving device to the inputs of many receiving devices (e.g., sixteen receiving devices). In some embodiments, an EDA program eliminates the DIR/SIR problem by adding buffer drivers between the output of the driving device and the inputs of many receiving devices. In the example above which includes sixteen receiving devices, after the layout diagram is modified by the EDA program, in one implementation, the output of the driving device is connected to the inputs of four buffer drivers, while the output of each of the four buffer drivers is connected to the inputs of four receiving devices. In some embodiments, for eliminating a DIR/SIR problem of a fan-out class, M number of buffers are placed in between a driver and N number of receivers, wherein M and N are integers. In method 900, after operation 920, the process flow proceeds to operation 930.

In operation 930 of method 900, a searching area for searching safe region candidates is determined. In the example embodiments as shown in FIG. 2, the searching area 200 surrounding the violated cell 101 is determined by an EDA program. In the example embodiments as shown in FIG. 3, the searching area 200 being divided into sixteen analysis regions is determined by an EDA program. After operation 930, the process flow proceeds to operation 940.

In operation 940 of method 900, an EDA program determines whether a safe region can be found within the searching area to eliminate a selected root cause. If a safe region cannot be found within the searching area, the process flow proceeds to operation 960. If a safe region is found within the searching area, the process flow proceeds to operation 952.

In operation 952 of method 900, a selected cell for moving to the safe region is determined by an EDA program based upon a class of the selected root cause. In operation 954 of method 900, the selected cell is moved to the safe region. In the example embodiments as shown in FIGS. 4A-4B, when the root cause of the violated cell belongs to the cluster class, the selected cell for moving to the safe region is the adjacent cell 194. In the example embodiments as shown in FIGS. 6A-6B, when the root cause of the violated cell belongs to the disturbed class, the selected cell for moving to the safe region is the adjacent cell 192. In the example embodiments as shown in FIGS. 8A-8B, when the root cause of the violated cell belongs to the disturbed class, the selected cell for moving to the safe region is the violated cell 101. After operation 952, the process flow proceeds to operation 960.

The process flow proceeds to operation 960 either after operation 952 when a selected cell is moved to a safe region or after operation 930 when a safe region is not found within the searching area. In operation 960 of method 900, an adjacent cell is selected for moving into a keep-out area. In the example embodiments as shown in FIGS. 5A-5B, when the root cause of the violated cell belongs to the cluster class, the selected adjacent cell for moving into the keep-out area is the adjacent cell 194. In the example embodiments as shown in FIGS. 7A-7B and FIGS. 8A-8B, when the root cause of the violated cell belongs to the disturbed class, the selected adjacent cell for moving into the keep-out area is the adjacent cell 192.

Figure 10:
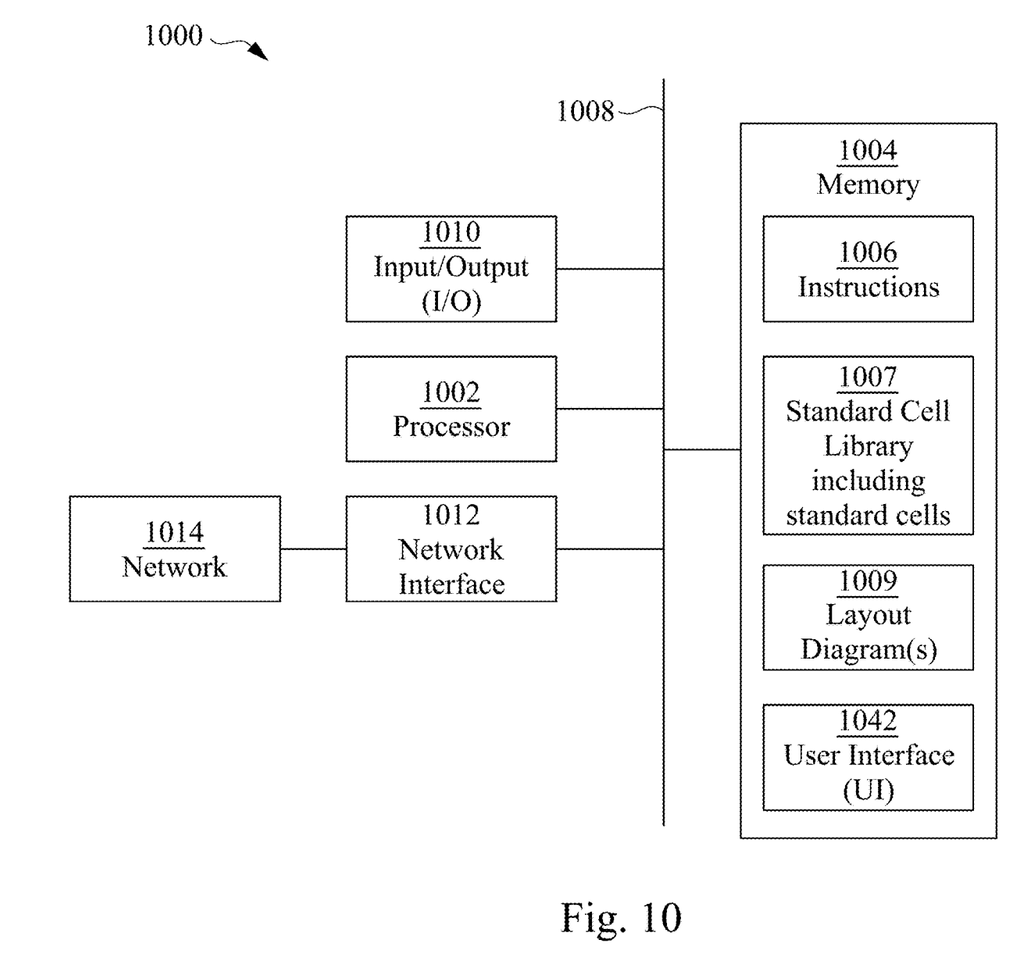
FIG. 10 is a block diagram of an electronic design automation (EDA) system in accordance with some embodiments.

FIG. 10 is a block diagram of an electronic design automation (EDA) system 1000 in accordance with some embodiments.

In some embodiments, EDA system 1000 includes an APR system. Methods described herein of designing layout diagrams represent wire routing arrangements, in accordance with one or more embodiments, are implementable, for example, using EDA system 1000, in accordance with some embodiments.

In some embodiments, EDA system 1000 is a general purpose computing device including a hardware processor 1002 and a non-transitory, computer-readable storage medium 1004. Storage medium 1004, among other things, is encoded with, i.e., stores, computer program code 1006, i.e., a set of executable instructions. Execution of instructions 1006 by hardware processor 1002 represents (at least in part) an EDA tool which implements a portion or all of the methods described herein in accordance with one or more embodiments (hereinafter, the noted processes and/or methods).

Processor 1002 is electrically coupled to computer-readable storage medium 1004 via a bus 1008. Processor 1002 is also electrically coupled to an I/O interface 1010 by bus 1008. A network interface 1012 is also electrically connected to processor 1002 via bus 1008. Network interface 1012 is connected to a network 1014, so that processor 1002 and computer-readable storage medium 1004 are capable of connecting to external elements via network 1014. Processor 1002 is configured to execute computer program code 1006 encoded in computer-readable storage medium 1004 in order to cause system 1000 to be usable for performing a portion or all of the noted processes and/or methods. In one or more embodiments, processor 1002 is a central processing unit (CPU), a multi-processor, a distributed processing system, an application specific integrated circuit (ASIC), and/or a suitable processing unit.

In one or more embodiments, computer-readable storage medium 1004 is an electronic, magnetic, optical, electromagnetic, infrared, and/or a semiconductor system (or apparatus or device). For example, computer-readable storage medium 1004 includes a semiconductor or solid-state memory, a magnetic tape, a removable computer diskette, a random access memory (RAM), a read-only memory (ROM), a rigid magnetic disk, and/or an optical disk. In one or more embodiments using optical disks, computer-readable storage medium 1004 includes a compact disk-read only memory (CD-ROM), a compact disk-read/write (CD-R/W), and/or a digital video disc (DVD).

In one or more embodiments, storage medium 1004 stores computer program code 1006 configured to cause system 1000 (where such execution represents (at least in part) the EDA tool) to be usable for performing a portion or all of the noted processes and/or methods. In one or more embodiments, storage medium 1004 also stores information which facilitates performing a portion or all of the noted processes and/or methods. In one or more embodiments, storage medium 1004 stores library 1007 of standard cells including such standard cells as disclosed herein. In one or more embodiments, storage medium 1004 stores one or more layout diagrams 1009 corresponding to one or more layouts disclosed herein.

EDA system 1000 includes I/O interface 1010. I/O interface 1010 is coupled to external circuitry. In one or more embodiments, I/O interface 1010 includes a keyboard, keypad, mouse, trackball, trackpad, touchscreen, and/or cursor direction keys for communicating information and commands to processor 1002.

EDA system 1000 also includes network interface 1012 coupled to processor 1002. Network interface 1012 allows system 1000 to communicate with network 1014, to which one or more other computer systems are connected. Network interface 1012 includes wireless network interfaces such as BLUETOOTH, WIFI, WIMAX, GPRS, or WCDMA; or wired network interfaces such as ETHERNET, USB, or IEEE-1364. In one or more embodiments, a portion or all of noted processes and/or methods, is implemented in two or more systems 1000.

System 1000 is configured to receive information through I/O interface 1010. The information received through I/O interface 1010 includes one or more of instructions, data, design rules, libraries of standard cells, and/or other parameters for processing by processor 1002. The information is transferred to processor 1002 via bus 1008. EDA system 1000 is configured to receive information related to a UI through I/O interface 1010. The information is stored in computer-readable medium 1004 as user interface (UI) 1042.

In some embodiments, a portion or all of the noted processes and/or methods is implemented as a standalone software application for execution by a processor. In some embodiments, a portion or all of the noted processes and/or methods is implemented as a software application that is a part of an additional software application. In some embodiments, a portion or all of the noted processes and/or methods is implemented as a plug-in to a software application. In some embodiments, at least one of the noted processes and/or methods is implemented as a software application that is a portion of an EDA tool. In some embodiments, a portion or all of the noted processes and/or methods is implemented as a software application that is used by EDA system 1000. In some embodiments, a layout diagram which includes standard cells is generated using a tool such as VIRTUOSO® available from CADENCE DESIGN SYSTEMS, Inc., or another suitable layout generating tool.

In some embodiments, the processes are realized as functions of a program stored in a non-transitory computer readable recording medium. Examples of a non-transitory computer readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

Figure 11:
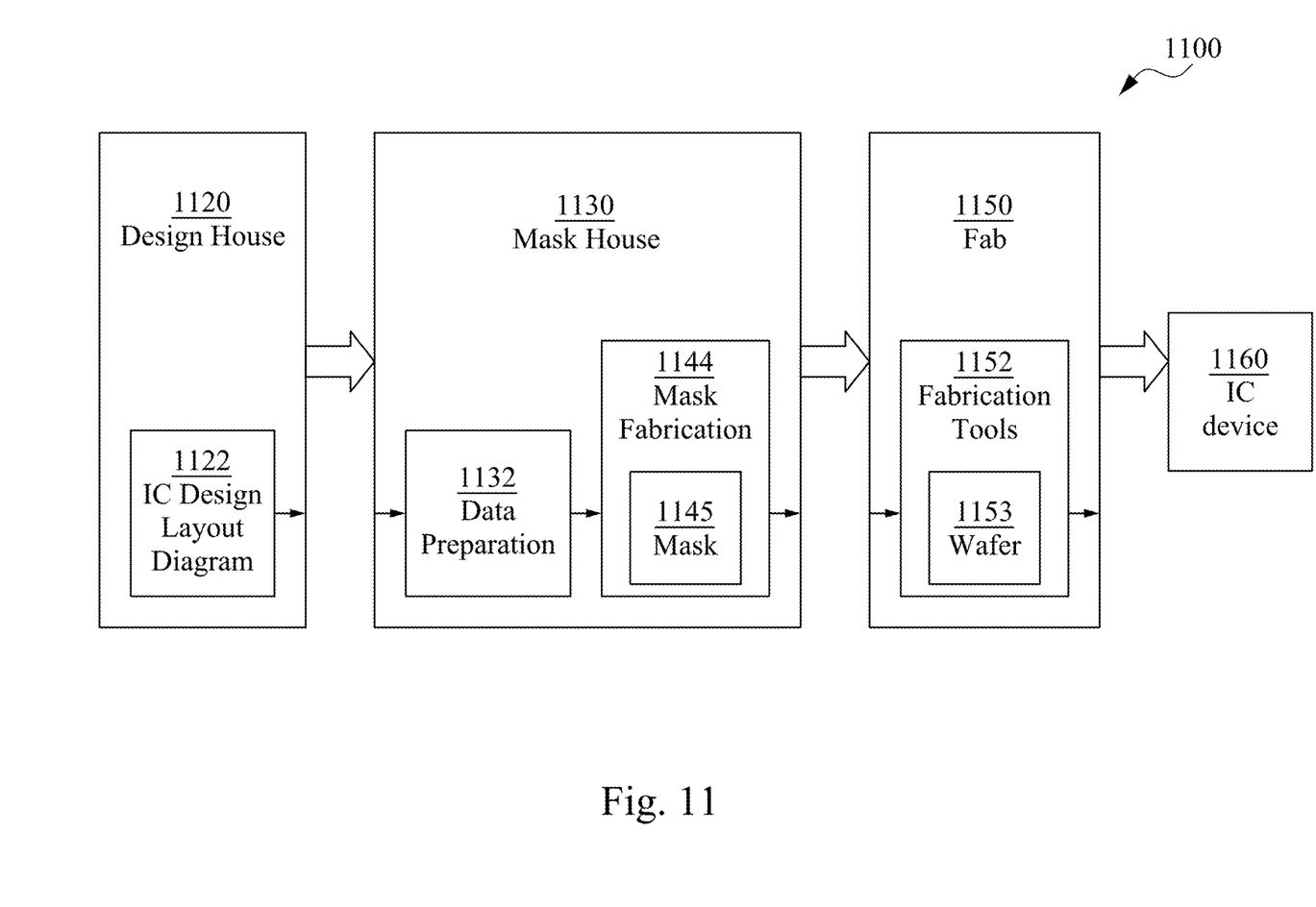
FIG. 11 is a block diagram of an integrated circuit (IC) manufacturing system, and an IC manufacturing flow associated therewith, in accordance with some embodiments.

FIG. 11 is a block diagram of an integrated circuit (IC) manufacturing system 1100, and an IC manufacturing flow associated therewith, in accordance with some embodiments. In some embodiments, based on a layout diagram, at least one of (A) one or more semiconductor masks or (B) at least one component in a layer of a semiconductor integrated circuit is fabricated using manufacturing system 1100.

In FIG. 11, IC manufacturing system 1100 includes entities, such as a design house 1120, a mask house 1130, and an IC manufacturer/fabricator ("fab") 1150, that interact with one another in the design, development, and manufacturing cycles and/or services related to manufacturing an IC device 1160. The entities in system 1100 are connected by a communications network. In some embodiments, the communications network is a single network. In some embodiments, the communications network is a variety of different networks, such as an intranet and the Internet. The communications network includes wired and/or wireless communication channels. Each entity interacts with one or more of the other entities and provides services to and/or receives services from one or more of the other entities. In some embodiments, two or more of design house 1120, mask house 1130, and IC fab 1150 is owned by a single larger company. In some embodiments, two or more of design house 1120, mask house 1130, and IC fab 1150 coexist in a common facility and use common resources.

Design house (or design team) 1120 generates an IC design layout diagram 1122. IC design layout diagram 1122 includes various geometrical patterns designed for an IC device 1160. The geometrical patterns correspond to patterns of metal, oxide, or semiconductor layers that make up the various components of IC device 1160 to be fabricated. The various layers combine to form various IC features. For example, a portion of IC design layout diagram 1122 includes various IC features, such as an active region, gate electrode, source and drain, metal lines or vias of an interlayer interconnection, and openings for bonding pads, to be formed in a semiconductor substrate (such as a silicon wafer) and various material layers disposed on the semiconductor substrate. Design house 1120 implements a proper design procedure to form IC design layout diagram 1122. The design procedure includes one or more of logic design, physical design or place and route. IC design layout diagram 1122 is presented in one or more data files having information of the geometrical patterns. For example, IC design layout diagram 1122 can be expressed in a GDSII file format or DFII file format.

Mask house 1130 includes data preparation 1132 and mask fabrication 1144. Mask house 1130 uses IC design layout diagram 1122 to manufacture one or more masks 1145 to be used for fabricating the various layers of IC device 1160 according to IC design layout diagram 1122. Mask house 1130 performs mask data preparation 1132, where IC design layout diagram 1122 is translated into a representative data file ("RDF"). Mask data preparation 1132 provides the RDF to mask fabrication 1144. Mask fabrication 1144 includes a mask writer. A mask writer converts the RDF to an image on a substrate, such as a mask (reticle) 1145 or a semiconductor wafer 1153. The design layout diagram 1122 is manipulated by mask data preparation 1132 to comply with particular characteristics of the mask writer and/or requirements of IC fab 1150. In FIG. 11, mask data preparation 1132 and mask fabrication 1144 are illustrated as separate elements. In some embodiments, mask data preparation 1132 and mask fabrication 1144 can be collectively referred to as mask data preparation.

In some embodiments, mask data preparation 1132 includes optical proximity correction (OPC) which uses lithography enhancement techniques to compensate for image errors, such as those that can arise from diffraction, interference, other process effects and the like. OPC adjusts IC design layout diagram 1122. In some embodiments, mask data preparation 1132 includes further resolution enhancement techniques (RET), such as off-axis illumination, sub-resolution assist features, phase-shifting masks, other suitable techniques, and the like or combinations thereof. In some embodiments, inverse lithography technology (ILT) is also used, which treats OPC as an inverse imaging problem.

In some embodiments, mask data preparation 1132 includes a mask rule checker (MRC) that checks the IC design layout diagram 1122 that has undergone processes in OPC with a set of mask creation rules which contain certain geometric and/or connectivity restrictions to ensure sufficient margins, to account for variability in semiconductor manufacturing processes, and the like. In some embodiments, the MRC modifies the IC design layout diagram 1122 to compensate for limitations during mask fabrication 1144, which may undo part of the modifications performed by OPC in order to meet mask creation rules.

In some embodiments, mask data preparation 1132 includes lithography process checking (LPC) that simulates processing that will be implemented by IC fab 1150 to fabricate IC device 1160. LPC simulates this processing based on IC design layout diagram 1122 to create a simulated manufactured device, such as IC device 1160. The processing parameters in LPC simulation can include parameters associated with various processes of the IC manufacturing cycle, parameters associated with tools used for manufacturing the IC, and/or other aspects of the manufacturing process. LPC takes into account various factors, such as aerial image contrast, depth of focus (DOF), mask error enhancement factor (MEEF), other suitable factors, and the like or combinations thereof. In some embodiments, after a simulated manufactured device has been created by LPC, if the simulated device is not close enough in shape to satisfy design rules, OPC and/or MRC are be repeated to further refine IC design layout diagram 1122.

It should be understood that the above description of mask data preparation 1132 has been simplified for the purposes of clarity. In some embodiments, data preparation 1132 includes additional features such as a logic operation (LOP) to modify the IC design layout diagram 1122 according to manufacturing rules. Additionally, the processes applied to IC design layout diagram 1122 during data preparation 1132 may be executed in a variety of different orders.

After mask data preparation 1132 and during mask fabrication 1144, a mask 1145 or a group of masks 1145 are fabricated based on the modified IC design layout diagram 1122. In some embodiments, mask fabrication 1144 includes performing one or more lithographic exposures based on IC design layout diagram 1122. In some embodiments, an electron-beam (e-beam) or a mechanism of multiple e-beams is used to form a pattern on a mask (photomask or reticle) 1145 based on the modified IC design layout diagram 1122. Mask 1145 can be formed in various technologies. In some embodiments, mask 1145 is formed using binary technology. In some embodiments, a mask pattern includes opaque regions and transparent regions. A radiation beam, such as an ultraviolet (UV) beam, used to expose the image sensitive material layer (e.g., photoresist) which has been coated on a wafer, is blocked by the opaque region and transmits through the transparent regions. In one example, a binary mask version of mask 1145 includes a transparent substrate (e.g., fused quartz) and an opaque material (e.g., chromium) coated in the opaque regions of the binary mask. In another example, mask 1145 is formed using a phase shift technology. In a phase shift mask (PSM) version of mask 1145, various features in the pattern formed on the phase shift mask are configured to have proper phase difference to enhance the resolution and imaging quality. In various examples, the phase shift mask can be attenuated PSM or alternating PSM. The mask(s) generated by mask fabrication 1144 is used in a variety of processes. For example, such a mask(s) is used in an ion implantation process to form various doped regions in semiconductor wafer 1153, in an etching process to form various etching regions in semiconductor wafer 1153, and/or in other suitable processes.

IC fab 1150 is an IC fabrication business that includes one or more manufacturing facilities for the fabrication of a variety of different IC products. In some embodiments, IC Fab 1150 is a semiconductor foundry. For example, there may be a manufacturing facility for the front end fabrication of a plurality of IC products (front-end-of-line (FEOL) fabrication), while a second manufacturing facility may provide the back end fabrication for the interconnection and packaging of the IC products (back-end-of-line (BEOL) fabrication), and a third manufacturing facility may provide other services for the foundry business.

IC fab 1150 includes fabrication tools 1152 configured to execute various manufacturing operations on semiconductor wafer 1153 such that IC device 1160 is fabricated in accordance with the mask(s), e.g., mask 1145. In various embodiments, fabrication tools 1152 include one or more of a wafer stepper, an ion implanter, a photoresist coater, a process chamber, e.g., a CVD chamber or LPCVD furnace, a CMP system, a plasma etch system, a wafer cleaning system, or other manufacturing equipment capable of performing one or more suitable manufacturing processes as discussed herein.

IC fab 1150 uses mask(s) 1145 fabricated by mask house 1130 to fabricate IC device 1160. Thus, IC fab 1150 at least indirectly uses IC design layout diagram 1122 to fabricate IC device 1160. In some embodiments, semiconductor wafer 1153 is fabricated by IC fab 1150 using mask(s) 1145 to form IC device 1160. In some embodiments, the IC fabrication includes performing one or more lithographic exposures based at least indirectly on IC design layout diagram 1122. Semiconductor wafer 1153 includes a silicon substrate or other proper substrate having material layers formed thereon. Semiconductor wafer 1153 further includes one or more of various doped regions, dielectric features, multi-level interconnects, and the like (formed at subsequent manufacturing steps).

Details regarding an integrated circuit (IC) manufacturing system (e.g., system 1100 of FIG. 11), and an IC manufacturing flow associated therewith are found, e.g., in U.S. Pat. No. 9,256,709, granted Feb. 9, 2016, U.S. Pre-Grant Publication No. 20150278429, published Oct. 1, 2015, U.S. Pre-Grant Publication No. 20140040838, published Feb. 6, 2014, and U.S. Pat. No. 7,260,442, granted Aug. 21, 2007, the entireties of each of which are hereby incorporated by reference.

One aspect of this description relates to a method of designing a layout diagram of an integrated circuit. The method includes identifying a cell in the layout diagram as a violated cell that fails to pass one or more design rules related to IR drops, and classifying a root cause of the violated cell with a root cause class. The method also includes determining a searching area for searching safe region candidates, and finding a selected cell for moving based upon the root cause class of the root cause. The method further includes finding a safe region in the searching area for moving the selected cell, and moving the selected cell to the safe region if the safe region is found within the searching area.

Another aspect of this description relates to a system for designing a layout diagram of an integrated circuit. The layout diagram is stored on a non-transitory computer-readable medium. The system comprising at least one processor and at least one memory including computer program code for one or more programs. The at least one memory, the computer program code and the at least one processor are configured to cause the system to perform operations. The system is caused to identify a cell in the layout diagram as a violated cell that fails to pass one or more design rules related to IR drops, and classify a root cause of the violated cell with a root cause class. The system is also caused to determine a searching area for searching safe region candidates, and find a selected cell for moving based upon the root cause class of the root cause. The system is further caused to find a safe region in the searching area for moving the selected cell, and move the selected cell to the safe region if the safe region is found within the searching area.

Still aspect of this description relates to a method of designing a layout diagram of an integrated circuit. The method includes identifying a cell in the layout diagram as a violated cell that fails to pass one or more design rules related to IR drops, and classifying each of one or more root causes of the violated cell with a corresponding root cause class. The method includes also determining a searching area for searching safe region candidates, and finding a safe region in the searching area for eliminating a selected root cause. The method still includes finding a selected cell for moving based upon the corresponding root cause class of the selected root cause, and moving the selected cell to the safe region if the safe region is found within the searching area.

It will be readily seen by one of ordinary skill in the art that one or more of the disclosed embodiments fulfill one or more of the advantages set forth above. After reading the foregoing specification, one of ordinary skill will be able to affect various changes, substitutions of equivalents and various other embodiments as broadly disclosed herein. It is therefore intended that the protection granted hereon be limited only by the definition contained in the appended claims and equivalents thereof.

What is claimed is:

1. A method of designing a layout diagram of an integrated circuit, the method comprising:
    identifying a cell in the layout diagram as a violated cell that fails to pass one or more design rules related to IR drops;
    classifying a root cause of the violated cell with a root cause class;
    determining a searching area in the layout diagram for searching safe region candidates;
    finding an adjacent cell that is adjacent to the violated cell as a selected cell for moving based upon the root cause class of the root cause;
    finding a safe region in the searching area for moving the selected cell; and
    moving the selected cell to the safe region in response to a condition that the safe region is found within the searching area.

2. The method of claim 1, wherein finding a safe region in the searching area comprises:
    dividing the searching area into multiple analysis regions;
    searching for the safe region in a first analysis region that has a lowest cell density among the multiple analysis regions; and
    searching for the safe region in a second analysis region that has a second lowest cell density among the multiple analysis regions in response to a condition that no safe region is found within the first analysis region.

3. The method of claim 1, wherein the root cause class is a cluster class, further comprising:
    selecting the adjacent cell that has highest peak current among all adjacent cells as the selected cell for moving to the safe region.

4. The method of claim 1, wherein the root cause class is a cluster class, and wherein the adjacent cell is an adjacent data cell, further comprising:
    selecting the adjacent data cell that has highest peak current among all adjacent data cells as the selected cell for moving to the safe region in response to a condition that the safe region is found within the searching area, and wherein the violated cell is adjacent to the adjacent data cell and at least one adjacent clock cell.

5. The method of claim 1, wherein the root cause class is a cluster class, and wherein the adjacent cell is an adjacent data cell, further comprising:
moving the adjacent cell that has highest peak current among all adjacent cells into a keep-out area in response to a condition that no safe region is found within the searching area, and wherein the violated cell is adjacent to the adjacent cells.

6. The method of claim 1, wherein the root cause class is a disturbed class, and wherein the adjacent cell is an adjacent data cell, further comprising:
selecting the adjacent data cell affecting the violated cell as the selected cell for moving to the safe region in response to a condition that the safe region is found within the searching area.

7. The method of claim 6, further comprising:
in response to a condition that no safe region is found within the searching area, moving the adjacent data cell into a keep-out area.

8. The method of claim 1, wherein the root cause class is a disturbed class, and wherein the adjacent cell is an adjacent clock cell, further comprising:
moving the adjacent clock cell affecting the violated cell into a keep-out area.

9. The method of claim 1, wherein the root cause class is a disturbed class, and wherein the adjacent cell is an adjacent data cell, further comprising:
adding a keep-out area surrounding the adjacent data cell affecting the violated cell.

10. The method of claim 1, wherein classifying the root cause of the violated cell comprises:
checking the root cause of the violated cell with a sequence of root cause classes.

11. The method of claim 10, wherein the sequence of root cause classes include a resistivity class, a cluster class, a self-induced class, and a disturbed class.

12. The method of claim 10, wherein the sequence of root cause classes follows an order that includes a resistivity class as a first root cause class, a cluster class as a second root cause class, a self-induced class as a third root cause class, and a disturbed class as a fourth root cause class.

13. The method of claim 1, wherein the searching area is configured to have safe region candidates in at least two voltage domains.

14. A system for designing a layout diagram of an integrated circuit, the layout diagram being stored on a non-transitory computer-readable medium, the system comprising at least one processor and at least one memory including computer program code for one or more programs, and wherein the at least one memory, the computer program code and the at least one processor are configured to cause the system to:
identify a cell in the layout diagram as a violated cell that fails to pass one or more design rules related to IR drops;
classify a root cause of the violated cell with a root cause class;
determine a searching area in the layout diagram for searching safe region candidates;
find an adjacent cell that is adjacent to the violated cell as a selected cell for moving based upon the root cause class of the root cause;
find a safe region in the searching area for moving the selected cell; and
move the selected cell to the safe region in response to a condition that the safe region is found within the searching area.

15. The system of claim 14, wherein the computer program code configured to cause the system to classify the root cause of the violated cell further comprises:
computer program code configured to cause the system to check root cause of the violated cell with a sequence of root cause classes.

16. The system of claim 15, wherein the sequence of root cause classes include a resistivity class, a cluster class, a self-induced class, and a disturbed class.

17. The system of claim 14, wherein the computer program code configured to cause the system to find the safe region is further configured to cause the system to:
divide the searching area into multiple analysis regions;
search for the safe region in a first analysis region that has a lowest cell density among the multiple analysis regions; and
search for the safe region in a second analysis region that has a second lowest cell density among the multiple analysis regions in response to a condition that no safe region is found within the first analysis region.

18. A method of designing a layout diagram of an integrated circuit, the method comprising:
identifying a cell in the layout diagram as a violated cell that fails to pass one or more design rules related to IR drops;
classifying each of one or more root causes of the violated cell with a corresponding root cause class;
determining a searching area in the layout diagram for searching safe region candidates;
finding a safe region in the searching area for eliminating a selected root cause;
finding an adjacent cell that is adjacent to the violated cell as a selected cell for moving based upon the corresponding root cause class of the selected root cause; and
moving the selected cell to the safe region in response to a condition that the safe region is found within the searching area.

19. The method of claim 18, wherein classifying the one or more root causes of the violated cell comprises:
checking the one or more root causes of the violated cell with a sequence of root cause classes.

20. The method of claim 19, wherein the sequence of root cause classes includes a resistivity class, a cluster class, a self-induced class, and a disturbed class.

* * * * *